United States Patent
Rantanen

(10) Patent No.: US 6,456,616 B1
(45) Date of Patent: Sep. 24, 2002

(54) SYSTEM AND METHOD TRANSMITTING DATA

(75) Inventor: Kari Rantanen, Masala (FI)

(73) Assignee: Sonera Oyj, Helsinki (FI)

( * ) Notice: Subject to any disclaimer, the term of this patent is extended or adjusted under 35 U.S.C. 154(b) by 0 days.

(21) Appl. No.: 09/125,157

(22) PCT Filed: Feb. 20, 1997

(86) PCT No.: PCT/FI97/00113

§ 371 (c)(1),
(2), (4) Date: Jan. 20, 1999

(87) PCT Pub. No.: WO97/31498

PCT Pub. Date: Aug. 28, 1997

(30) Foreign Application Priority Data

Feb. 20, 1996 (FI) .................................................. 960760

(51) Int. Cl.⁷ .......................... H04L 12/66; H04L 12/56
(52) U.S. Cl. ........................ 370/352; 370/401; 370/410
(58) Field of Search ................................ 370/338, 352, 370/356, 400, 455, 466, 328, 329, 401, 410, 522; 455/466, 412

(56) References Cited

U.S. PATENT DOCUMENTS

| | | | | |
|---|---|---|---|---|
| 5,742,668 A | * | 4/1998 | Pepe et al. | 379/58 |
| 5,745,850 A | * | 4/1998 | Aldermeshian et al. | 455/417 |
| 5,809,415 A | * | 9/1998 | Rossmann | 455/422 |

FOREIGN PATENT DOCUMENTS

| | | |
|---|---|---|
| WO | 93/26131 | 12/1993 |
| WO | 94/13070 | 6/1994 |
| WO | 94/26073 | 11/1994 |
| WO | 95/06381 | 3/1995 |
| WO | 95/12292 | 5/1995 |
| WO | 95/20281 | 7/1995 |
| WO | 95/20300 | 7/1995 |

* cited by examiner

Primary Examiner—Chau Nguyen
Assistant Examiner—Soon-Dong Hyun
(74) Attorney, Agent, or Firm—Nath & Associates PLLC; Gary M. Nath; Marvin C. Berkowitz

(57) ABSTRACT

Disclosed is a system and method to transmit data to a company's data system by a mobile phone connected to a mobile communications network, and receive an acknowledgment to the same mobile phone from the company's data system. A preset target number dialed by a mobile phone is directed to an intelligent network center. The target number is decoded into data which is transmitted to a company's data system during the connection. The intelligent network center uses the caller's identifying number to check whether the caller is entitled to use the service, and to check to which information system of which company the data has been sent. The intelligent network center transmits a telecommunications network signaling the target number, caller's number and address of the company's to a voice server computer capable of identifying telephone numbers and formulate voice messages. The voice server converts the target number into data and transmits the data and the caller's number to the company's data system using a data network protocol. The company's data system stores the data in the data system and formulates a return message, which includes an acknowledgment of the received data and further a possible additional information, and transmits it to the voice server using the data network. The voice server transmits using the mobile communications network the return message either as a GSM short message or as a voice message to the mobile station which transmitted the data code, or as a pager message to a desired pager device.

12 Claims, 3 Drawing Sheets

SYSTEM AND METHOD TRANSMITTING DATA

FIELD OF THE INVENTION

The present invention relates to a system and method for transmitting data to a company's data system by a mobile station linked to a mobile communications network, and for receiving from the company's data system acknowledgment to the same mobile station.

BACKGROUND OF THE INVENTION

A mobile station can be used for data transmission by connecting it, for example, to a portable computer and by using therein a modem which complies with the mobile station in question. Then a first connection is established to the modem pool of a receiving data system, and there after data is transmitted once the connection has been made. Another possibility, especially in a GSM system, is to send data as a short message or SMS-message. On the other hand, there exists services based on A-subscriber identifying and number conversion in the intelligent network centre, which make it possible to make a call from mobile stations to extension numbers of a company's local area network by using just the extension number as the dialing number.

A drawback of the above mentioned transmission modes of mobile data is, that if a modem transmission is used, it takes tens of seconds to establish a connection, data transmission can begin only there after. The modems required are also fairly expensive. However, a problem with short message is that transmission thereof by the mobile station is quite complicated and at the receiving side there are no direct interfaces to the data systems.

SUMMARY OF THE INVENTION

The main objective of the present invention is to eliminate the drawbacks and disadvantages mentioned above, and to enable a new type of system and method for transmitting data and for receiving acknowledgment. This objective has been achieved by the type of the system and method mentioned in the beginning, the characteristic features thereof are disclosed in the accompanying claims.

According to the present invention, a mobile station transmits data as coded directly to a target number of a company's data system. The caller's number (A-identity, in the case of a mobile station subscriber IMSI or the international mobile subscriber identity) and the target number dialed by the caller (B number) together decide what function follows from the contact. A suffix of the numeric sequence is converted to data using an intelligent, programmable server connected to the telephone network. Caller identification is used to restrict mobile stations accessing within the service. The restriction is effected by the intelligent network centre. The data and A-number associated therein are transmitted from the server to the customer's data system by using a data network connection. A voice message or, in the case of GSM-mobile phone, a short message service (SMS) is used to acknowledge message arrival and a real time transmission of a return message directly from the customer's data system back to the same mobile phone, which sent the data code.

As an advantages of the invention can be mentioned, that the entire code transmission-return message is in real time and the entire process chain using a GSM mobile phone takes only around some ten seconds. The mobile phone requires no ancillary equipment to make the data transmission possible.

The invention is described in the following in more detail detailed manner with reference to the accompanying drawings, wherein:

DETAILED DESCRIPTION

Figure 1:
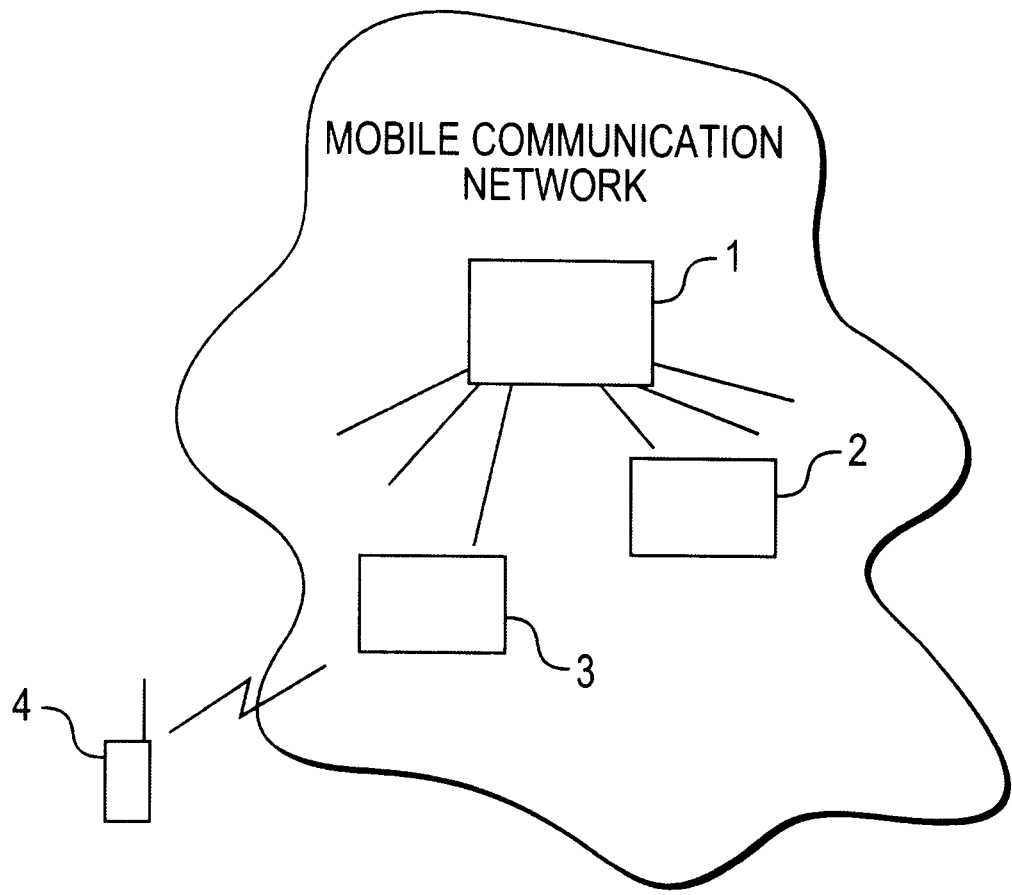
FIG. 1 shows the structure of the mobile communications network

FIG. 1 shows the structure of the mobile communications network. The mobile communications network comprises at least one mobile services switching centre 1, at least one base station controller 2 and at least one base station 3. The mobile services switching centre can be the mobile station's home location centre, wherein the mobile station is registered, a visitor location centre, within the area of which the mobile phone is located at any given time, but where it is not permanently registered, or a gateway mobile services switching centre, to which a call is directed from outside the mobile communications network when it is not directed straight to the mobile services switching centre of the mobile communications network, in the area of which the mobile phone is located. A base station controller is an equipment belonging to the mobile communications network, which controls the function of one or more base stations with respect to forming a call, signaling, use of radio channels and various maintenance functions. The base station is a transmitter-receiver station of the mobile communications network, to which the mobile phones are in contact.

Figure 2:
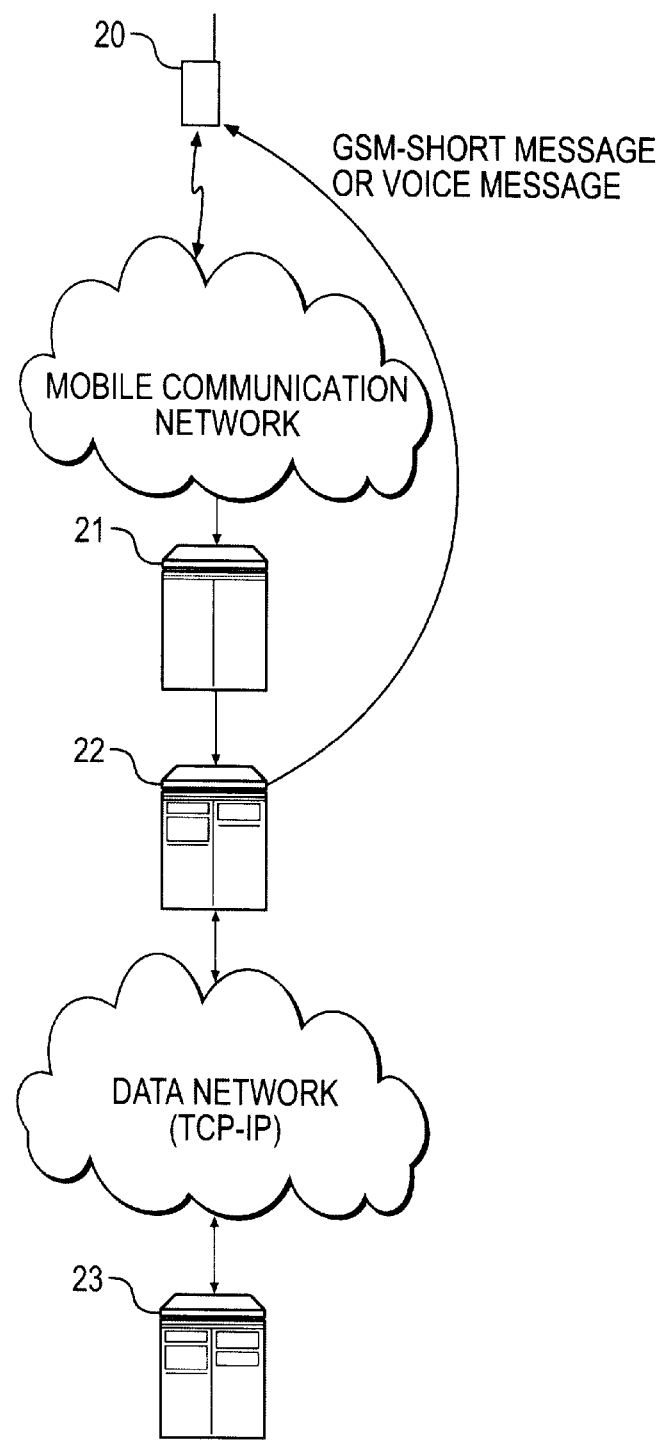
FIG. 2 shows the structure of the system according to the invention

In the FIG. 2 is shown the structure of system according to the invention. The mobile phone 20 calls via the mobile communications network to an intelligent network centre 21 by using as a target number (B-number) a number, which includes a number code of the data to be transmitted. When calling to a public telecommunications network by a mobile phone, the B numbers always begin with 0, 1 or 9, because calling to all numbers in a local telecommunications network takes place using a directory area code beginning with 9 (will change to a telecommunications area code beginning with 0 in October 1996), and service, emergency, international and mobile communications network numbers also begin with 0, 1 or 9. Hence the numbers beginning 2–8 within the numbering space are free for other use, such as for the data code usage in accordance with the invention. In the beginning of the B number can be used f.ex. a double digit code to indicate, that there is a data code transmission in question, if a numbering space beginning with 2–8 is used also f.ex. as dialing numbers for numbers of a company's local area network. The intelligent network centre checks basing to the caller's number (A-identity, in the case of a mobile subscriber the IMSI or international mobile subscriber identity) whether the caller is entitled to use the service. Furthermore, based on the A-number, the intelligent centre determines to which data centre in which company the mobile phone is sending the data code. After this the intelligent centre transmits preferably by using telecommunications network signaling the B-number (data code), A number both the address of the company's data system to a voice server 22. The voice server is a computer connected to the telecommunications and data network which is also able to identify telephone numbers and formulate voice messages. The voice server converts B number into data and transmits the data both the A-number into the company's data system 23 by using a data network, preferably a data network based on TCP/IP protocol. The company's data system stores the data in the data system and formulates a return message, which includes an acknowledgment of the received data and further a possible additional information, and transmits it to the voice server using the data network. The voice server transmits using the mobile communications network the return message either as a GSM short message (text message) or as a voice message to the mobile phone, which transmitted the data code, or as a pager message to the required pager device. There exists a direct connection from the voice server to the GSM short message centre and pager system. If the return message is sent as the voice message, the voice server opens a speech channel to the calling mobile phone and transmits a voice message. Otherwise there is no need to open any voice connection, since the return message is sent as a separate GSM short message or pager message, and data transmission and transmission in the telecommunications network takes place purely as a signal message without opening the speech channel.

Figure 3:
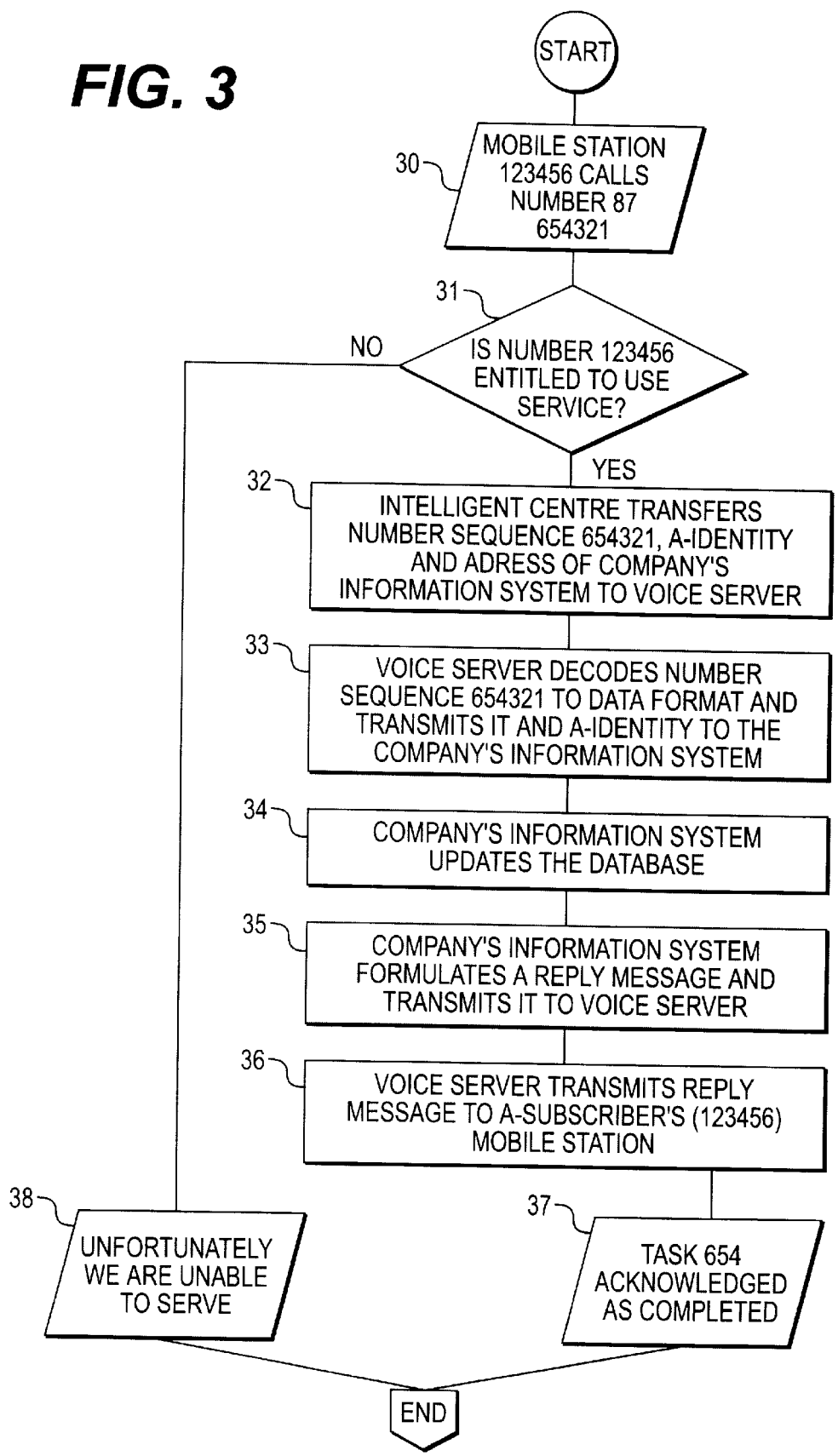
FIG. 3 shows a flowchart of function of the system.

In the FIG. 3 is shown as a flowchart in a form of an example function of the system in accordance with the invention. In the point 30 the a mobile station, the A-number of which is 123456 calls to a target number 87 654321, wherein the 87 is the identity code, which tells that there is a question of data code transmission, and the 654321 is the transmitted data code. The call is directed to an intelligent network centre, which checks at point 31 on the basis of the A-number to see whether the mobile station is entitled to use the service, and to which information system of which company the mobile station is sending the data code. At point 32 the intelligent network centre transmits using the telecommunications network signaling the data code 654321, the A-identity 123456 and the address of the company's data system to the voice server. At point 33 the voice server converts numerical code 654321 into data format and transmits it and the A-identity to the company's data system. At point 34 the company's data system makes updating to the database f.ex. "mechanician NN completed job 654 using therein 3 spare parts, time used 21 minutes". At point 35 the company's data system formulates a suitable return message f.ex. "Job 654 acknowledged as completed. Next job no. 655 is at address Sturenkatu 16, contact person MM", and transmit it to the voice server. At point 36 the voice server transmits the return message as a GSM short message or voice message to the mobile station, which sent the data code. The entire process chain takes time only around 10 seconds.

Above for the data code transmission is used a mobile station. For the data code transmission can also be used a combination of a mobile station and portable computer, or a fixed network telephone. If a fixed network telephone is used for the data code transmission suitable dialing numbers belonging to numbering in the public telecommunications network must be reserved for use which are directed to the intelligent network centre.

The invention is described above by referring to one of its preferred embodiment. However, this is by no means an attempt to limit the invention to concern just this example, but all variations within the spirit of the inventive idea disclosed in the following claims are possible

What is claimed is:

1. Method to transmit data to a company's data system by a mobile phone connected to a mobile communications network, and to receive an acknowledgment to the same mobile phone or to a desired pager device from the company's data system, characterized in that a previously defined target number is dialed by a mobile station, which is directed to an intelligent network center, said target number comprising a data code representing the data to be transmitted, the data code is converted into the data and the data is transmitted to the company's data system during the connection, and the acknowledgment is transmitted during the connection as a voice message or as a GSM short message in a text format, selectively either to the mobile station, which sent the data code, or as a pager message to the desired pager device.

2. Method according to claim 1, characterized in that an identifying number of a caller is used to check whether the caller is entitled to use a service, and to check to which data system of which company the data has been sent.

3. Method according to claim 1, characterized in that the intelligent network center transmits the target number including the data code, a caller's number and an address of the company's data system to a voice server that is a computer capable of identifying telephone numbers and formulating voice messages, the voice server converts the data code into the data and transmits the data and the caller's number into the company's data system using a data network.

4. Method according to claim 1, characterized in that the company's data system stores the data into the data system and formulates a return message, which includes the acknowledgment of the data received and selectively includes additional information, and transmits it to a voice server using a data network, the voice server transmits using the mobile communications network the return message either as the GSM short message in a text format or as the voice message to the mobile station, which sent the data code, or as the pager message to the desired pager device.

5. Method according to claim 2, characterized in that the intelligent network center transmits the target number including the data code, a caller's number and an address of the company's data system to a voice server that is a computer capable of identifying telephone numbers and formulating voice messages, the voice server converts the data code into the data and transmits the data and the caller's number into the company's data system using a data network.

6. Method according to claim 2, characterized in that the company's data system stores the data into the data system and formulates a return message, which includes the acknowledgment of the data received and selectively includes additional information, and transmits it to a voice server using a data network, the voice server transmits using the mobile communications network the return message either as the GSM short message in a text format or as the voice message to the mobile station, which sent the data, or as the pager message to the desired pager device.

7. Method according to claim 3, characterized in that the company's data system stores the data into the data system and formulates a return message, which includes the acknowledgment of the data received and selectively includes additional information, and transmits it to the voice server using the data network, the voice server transmits using the mobile communications network the return message either as the GSM short message in a text format or as the voice message to the mobile station, which sent the data, or as the pager message to the desired pager device.

8. Method according to claim 5, characterized in that the company's data system stores the data into the data system and formulates a return message, which includes the acknowledgment of the data received and selectively includes additional information, and transmits it to the voice server using the data network, the voice server transmits using the mobile communications network the return message either as the GSM short message in a text format or as the voice message to the mobile station, which sent the data, or as the pager message to the desired pager device.

9. The method according to claim 3, wherein the intelligent network center transmits by using a telecommunications network signaling.

10. The method according to claim 3, wherein the data network is based on TCP/IP protocol.

11. The method according to claim 5, wherein the intelligent network center transmits by using a telecommunications network signaling.

12. The method according to claim 5, wherein the data network is based on TCP/IP protocol.

* * * * *